US007607085B1

(12) United States Patent
Lassesen

(10) Patent No.: US 7,607,085 B1
(45) Date of Patent: Oct. 20, 2009

(54) CLIENT SIDE LOCALIZATIONS ON THE WORLD WIDE WEB

(75) Inventor: Kenneth M. Lassesen, Kingston, WA (US)

(73) Assignee: Microsoft Corporation, Redmond, WA (US)

( * ) Notice: Subject to any disclaimer, the term of this patent is extended or adjusted under 35 U.S.C. 154(b) by 698 days.

(21) Appl. No.: 09/309,372

(22) Filed: May 11, 1999

(51) Int. Cl.
G06F 17/00 (2006.01)
G06F 17/28 (2006.01)
G06F 15/16 (2006.01)

(52) U.S. Cl. .................. 715/264; 715/234; 715/255; 715/265; 704/4; 709/203; 709/227

(58) Field of Classification Search .................. 707/536, 707/2; 709/218, 203; 704/277, 3, 2, 8, 4, 704/5, 9; 715/500.1, 501.1, 526, 540, 703, 715/200–202, 205, 234–236, 239, 255, 256, 715/259, 264, 265, 273, 700, 730, 760, 762, 715/763, 823, 825, 845, 856, 859, 860, 861, 715/536; 345/703

See application file for complete search history.

(56) References Cited

U.S. PATENT DOCUMENTS

| 5,384,701 | A | * | 1/1995 | Stentiford et al. ............... 704/3 |
| 5,416,903 | A | * | 5/1995 | Malcolm ..................... 715/703 |
| 5,583,761 | A | * | 12/1996 | Chou ......................... 715/536 |
| 5,715,453 | A | * | 2/1998 | Stewart ....................... 715/513 |
| 5,778,356 | A | * | 7/1998 | Heiny ........................... 707/2 |
| 5,917,484 | A | * | 6/1999 | Mullaney ..................... 715/703 |
| 5,944,790 | A | * | 8/1999 | Levy ........................... 709/218 |
| 5,974,372 | A | * | 10/1999 | Barnes et al. .................. 704/8 |
| 5,987,402 | A | * | 11/1999 | Murata et al. .................. 704/2 |
| 6,073,090 | A | * | 6/2000 | Fortune et al. ................. 704/8 |
| 6,092,035 | A | * | 7/2000 | Kurachi et al. ................. 704/3 |
| 6,092,036 | A | * | 7/2000 | Hamann ........................ 704/8 |
| 6,119,078 | A | * | 9/2000 | Kobayakawa et al. .......... 704/3 |
| 6,122,658 | A | * | 9/2000 | Chaddha ..................... 709/203 |
| 6,182,099 | B1 | * | 1/2001 | Nakasato ..................... 715/536 |
| 6,282,507 | B1 | * | 8/2001 | Horiguchi et al. .............. 704/3 |
| 6,324,500 | B1 | * | 11/2001 | Amro et al. .................... 704/8 |

(Continued)

OTHER PUBLICATIONS

Emmanuel Uren, "Annotated Bbibliography on Internationalization and Localization", ACM SIGDOC Asterisk Journal of Computer Documentation, vol. 21,Issue 1, Feb. 1997, pp. 26-33.*

(Continued)

*Primary Examiner*—Laurie Ries
*Assistant Examiner*—MaiKhanh Nguyen
(74) *Attorney, Agent, or Firm*—Perkins Coie LLP

(57) ABSTRACT

A method of providing an electronic file, such as a Web document in HTML format, over the Internet from a server to a client is disclosed. Each word and/or phrase in the Web document is assigned an identifier that corresponds to a translation for the word and/or phrase. A user utilizes a client to select a language in which the Web document is to be displayed. The Web document is then transmitted to the client. The identifiers in the Web document are used to replace each word and/or phrase in the Web document with the foreign language translation of the word and/or phrase. The foreign language translation is then substituted for each word and/or phrase in the Web document. The resulting Web document is then displayed on a Web browser on the client to the user.

13 Claims, 6 Drawing Sheets

U.S. PATENT DOCUMENTS

| | | | |
|---|---|---|---|
| 6,334,101 B1* | 12/2001 | Hetherington et al. | 704/8 |
| 6,345,293 B1* | 2/2002 | Chaddha | 709/219 |
| 6,393,443 B1* | 5/2002 | Rubin et al. | 715/533 |
| 6,411,924 B1* | 6/2002 | de Hita et al. | 704/9 |
| 6,412,008 B1* | 6/2002 | Fields et al. | 709/228 |
| 6,490,547 B1* | 12/2002 | Atkin et al. | 704/8 |
| 6,492,995 B1* | 12/2002 | Atkin et al. | 715/703 |
| 6,496,844 B1* | 12/2002 | Hetherington et al. | 715/536 |
| 6,523,037 B1* | 2/2003 | Monahan et al. | 707/10 |
| 6,559,861 B1* | 5/2003 | Kennelly et al. | 345/703 |
| 6,623,529 B1* | 9/2003 | Lakritz | 715/536 |
| 6,632,248 B1* | 10/2003 | Isaac et al. | 715/501.1 |
| 6,647,425 B1* | 11/2003 | Chaddha | 709/233 |
| 6,757,688 B1* | 6/2004 | Leapaldt et al. | 707/101 |
| 6,993,471 B1* | 1/2006 | Flanagan et al. | 704/2 |

OTHER PUBLICATIONS

Maeda, Akira et al. "Viewing Multilingual Documents on Your Local Web Browsers", Communications of the ACM, Vo. 41, No. 4, Apr. 1998, pp. 64-65.*

Kim, Hong et al. "A Presentation Agent for Multilingual Services", IEEE Network Operations and Management Symposium, vol. 2, No. 9B, Sep. 1993, pp. 634-644.*

O'Conner, "Java Internationalization: An Overview", Java Developer Connection-java.sun.com, Jul. 1998, pp. 1-9.*

Flanagan, "Java in a Nutshell", Second Edition, May 1997, pp. 201-223, 535-541.*

T. Sakaguchi, "A Browsing Tool for Multi-lingual Documents for Users without Multi-lingual Fonts", ACM International Conference on Digital Libraries, pp. 63-71, Mar. 1996.*

* cited by examiner

CLIENT SIDE LOCALIZATIONS ON THE WORLD WIDE WEB

TECHNICAL FIELD OF THE INVENTION

The present invention relates to the field of network browsing software and, in particular, to a method of translating (i.e. localizing) a Web page from one language to another language (e.g. English to French).

BACKGROUND OF THE INVENTION

In recent years, there has been a tremendous proliferation of computers connected to a global network known as the Internet. A "client" computer connected to the Internet can download digital information from "server" computers connected to the Internet. Client application and operating system software executing on client computers typically accepts commands from a user and obtains data and services by sending requests to server applications running on server computers connected to the Internet. A number of protocols are used to exchange commands and data between computers connected to the Internet. The protocols include the File Transfer Protocol (FTP), the Hyper Text Transfer Protocol (HTTP), the Simple Mail Transfer Protocol (SMTP), and other protocols.

The HTTP protocol is used to access data on the World Wide Web, often referred to as "the Web." The World Wide Web is an information service on the Internet providing documents and links between documents. The World Wide Web is made up of numerous Web sites around the world that maintain and distribute Web documents (i.e. otherwise known as Web pages).

A Web site may use one or more Web server computers that are able to store and distribute documents in one of a number of formats including the Hyper Text Markup Language (HTML). An HTML document can contain text, graphics, audio clips, and video clips, as well as metadata or commands providing formatting information. HTML documents also include embedded "links" that reference other data or documents located on the local computer or network server computers.

A Web browser is a client application, software component, or operating system utility that communicates with server computers via FTP, HTTP, and Gopher protocols. Web browsers receive Web documents from the network and present them to a user. Internet Explorer, available from Microsoft Corporation, of Redmond, Wash., is an example of a popular Web browser. As long a Web document is in a computer readable format, such as HTML, a Web browser is able to display the Web document to a user, regardless of the language of the text contained in the Web document (e.g. English, French, Italian, German, Spanish, Japanese, etc.). Although the Web browser is able to display the text of the Web document, the text is frequently in a language that is foreign to, and thus unreadable by, the user. This is a significant limitation of the Web.

In the past, Web document and Web site developers have attempted to solve this problem by manually translating each Web document into separate languages. More particularly, developers would create a separate Web page with its own uniform resource locator (URL) for each desired language. Under this approach, each translated Web page is transmitted separately. Thus, this approach requires large volumes of data and increases network transmission. In addition, this approach is very time consuming, costly and inefficient.

Accordingly, it is an object of the present invention to provide a method of allowing users to immediately translate electronic files, such as Web documents, into the language of their choice.

SUMMARY OF THE INVENTION

The method of the present invention allows users to immediately translate electronic files, such as Web documents, into the language of their choice. In this method, each phrase and/or word in the Web document is assigned an identifier that corresponds to a translation for the phrase. (The present invention works identically for both phrases as well as individual words contained within a Web document. However, only the term "phrase" is referred to hereinafter.) The client is provided a copy of the Web document. A user is then able to select a language in which the user would like the Web document to be displayed. After the user makes his or her language selection, the identifiers in the Web document are used to replace each phrase in the Web document with the foreign language translation of the phrase. The foreign language translation is then substituted for each phrase in the Web document. If a translation for a particular phrase is not available, the particular phrase is not replaced. The resulting Web document is then displayed to the user on a Web browser on the client.

BRIEF DESCRIPTION OF THE DRAWINGS

The present invention may take physical form in certain parts and steps, embodiments of which will be described in detail in this specification and illustrated in the accompanying drawings which form a part hereof, wherein.

DETAILED DESCRIPTION OF THE INVENTION

As illustrated in FIGS. 2-6, the present invention provides a method of enabling multiple, concurrent, language translation (i.e. localization) of Web pages within a Web browser 200. The method allows users to immediately translate prepared pages into the languages of their choice (including double byte character sets) without requiring additional transmissions across the network. In addition, the present invention obviates the current practice of site owners producing separate Web pages for each language to be supported.

In this invention, a client downloads from a server a translation for each phrase contained in a Web page 202. The downloaded phrases are transferred from the server to the client in the form of a data structure. The data structure can be in an included file or provided by some other mechanism. The present invention supports dynamic changing of languages and the concurrent display of multiple languages. In addition, neither the Web page nor the localized (i.e. translated) phrases need to be compiled. Further, each phrase library self-registers itself, and phrases may contain display information (e.g. HTML tags) including localized graphics and media files.

Once the phrase translations have been downloaded from a server to the client, a Web browser 200 replaces each phrase in the Web document 202 with its corresponding phrase translation. The resulting Web document 202 is then displayed by the Web browser 200.

Figure 1:
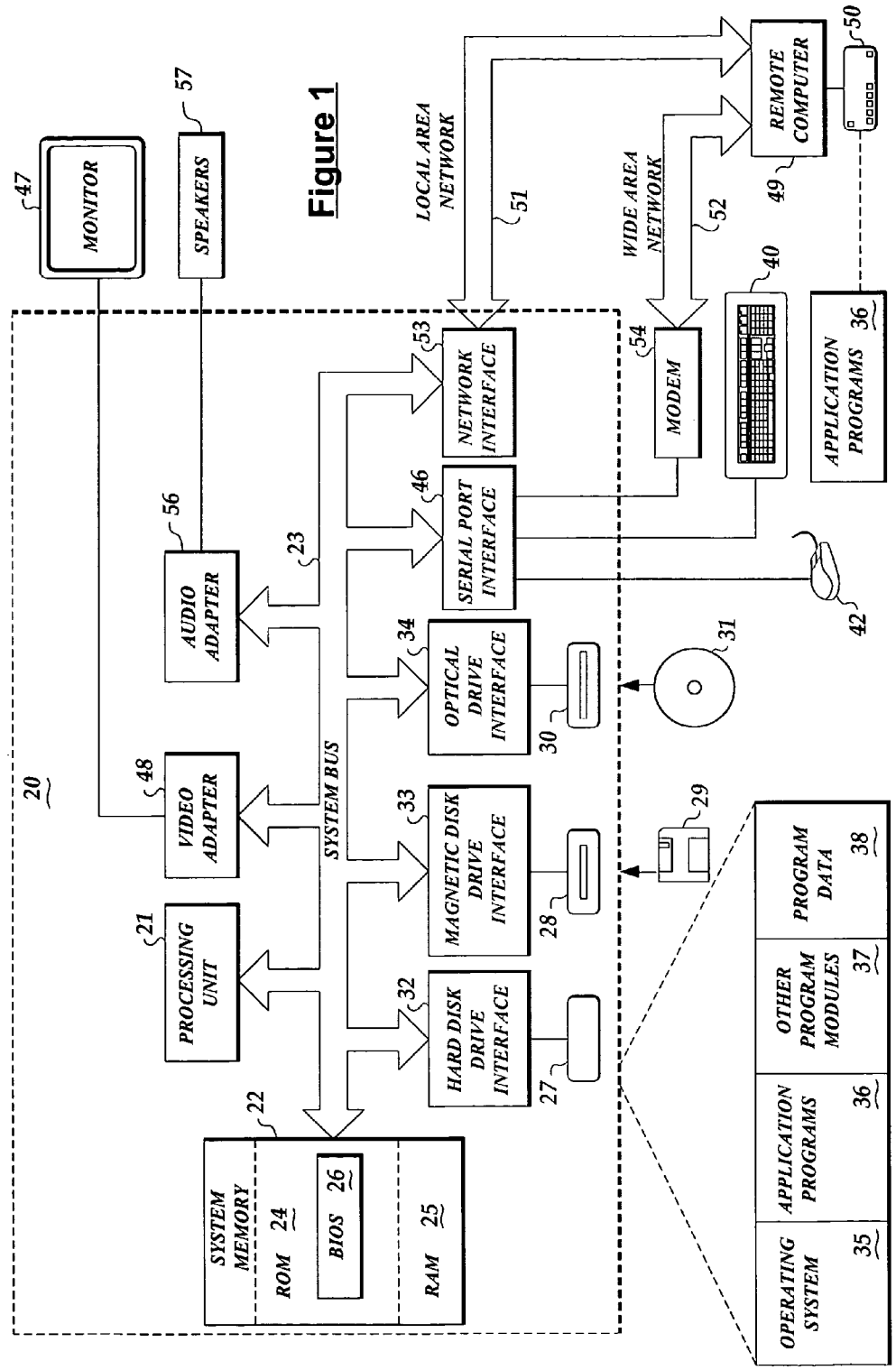
FIG. 1 is a block diagram of a general-purpose computer system for implementing the present invention.

In accordance with the present invention, a Web browser 200 executes on a computer, such as a general-purpose personal computer. FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer-readable media which can store data that is accessible by a computer, such as magnetic cassettes, flash memory cards, digital versatile disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. One or more speakers 57 are also connected to the system bus 23 via an interface, such as an audio adapter 56. In addition to the monitor and speakers, personal computers typically include other peripheral output devices (not shown), such as printers.

The personal computer 20 may operate in a networked environment using logical connections to one or more remote computers, such as remote computers 49 and 60. Each remote computer 49 or 60 may be another personal computer, a server, a router, a network PC, a peer device or other common network node, and typically includes many or all of the elements described above relative to the personal computer 20, although only a memory storage device 50 or 61 has been illustrated in FIG. 1. The logical connections depicted in FIG. 1 include a local area network (LAN) 51 and a wide area network (WAN) 52, Such networking environments are commonplace in offices, enterprise-wide computer networks, intranets and the Internet. As depicted in FIG. 1, the remote computer 60 communicates with the personal computer 20 via the local area network 51. The remote computer 49 communicates with the personal computer 20 via the wide area network 52.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the present invention, a list of phrases (and/or words) in the HTML page(s) to be localized (i.e. translated) is obtained. Each phrase is assigned a unique identifier. Any type of identifier could be used including, but not limited to, ASCII characters, ASCII numbers, alpha-numeric combinations, binary control codes, other numeric representations, etc. In one embodiment, ASCII numbers are used as the unique identifiers.

After unique identifiers have been assigned, each phrase is localized and then stored in a data structure supported by the Web browser 200. An example of this is shown below. Although this example is written in JavaScript, any scripting or programming language could be utilized. JavaScript is an open scripting language that is supported by many Web browsers, and anyone can use this scripting language without purchasing a license. JavaScript can interact with HTML source code and enables Web authors to design interactive sites that include dynamic content.

//this comes from file 1036.lcid

```
function LCID1036( ) {var L=new Array;L[0]="Créé par
    Monsieur Lassesen";
  L[1]="Changez Le Mot de passe";
  L[2]="Vous êtes priés de changer le mot de passe de ce
    compte. Veuillez le changer ci-dessous. Vous pouvez
    changer votre email (et cette identification de PROCÉ-
    DURE DE CONNEXION) en choisissant 'mon infor-
    mation' sous des utilitaires dans l'arbre du côté
    gauche.";
  L[3]="La bienvenue au client enregistre";
  L[4]="Entrez Le Nouveau Mot de passe:";
  L[5]="Confirmez Le Nouveau Mot de passe";
  L[6]="Des mots de passe sont exigés pour être au moins 6
    caracteres longtemps, incluent des lettres majuscules et
    minuscules et un nombre.";
  L[23]="Ce site exige le Microsoft Internet Explorer 4,01
    ou plus haut";
  return L};
languages[languages.length]=['French(Standard)', 1036,
    LCID1036( )];
```

In the above example, each language self-registers itself into an array called languages, allowing dynamic addition of localization after the page to be displayed is downloaded.

In a typical application, if the user has selected more than one language, then a select box 204, lcid, appears on the page displaying the name of the available languages when the tranonload( ) procedure is executed. The tranonload( ) enumerates the available languages 300 in this select box 204.

```
<BODY onload=tranonload( )>
<SELECT onchange=TR( ) class=lcid name=lcid></Se-
    lect>
<SCRIPT LANGUAGE=JAVASCRIPT>
function tranonload( ) {
  for(i=0;i<languages.length;i++) {
    lcid[lcid.length]=new Option(languages[i][0])//En-
        glish Title
    lcid[lcid.length-1].value=languages[i][1]//LCID
  }
}
```

When the user selects another language, the Web document 202 is preferably searched and phrases are replaced using DHTML. Dynamic HTML (DHTML) refers to Web content that capable of changing each time the Web page is viewed. For example, the same URL could result in a different page depending on any number of parameters, such as: geographic location of the reader, time of day, previous page(s) viewed by the reader, and profile of the reader. Currently, there are many technologies for producing DHTML, including CGI scripts, Server-Side Includes (SSI), cookies, Java, JavaScript, and ActiveX®. Also, DHTML refers to new HTML extensions that enable Web pages to react to user input without sending requests to Web servers. In an alternate embodiment, Web documents are reconstructed using the localized phrases, if DHTML is not available.

As shown below, the identifier for each phrase in the document is located. (In this example, the identifier is part of the class element's name.) After being located, the existing phrase is replaced with its translation—if available. If a translation for a particular phrase is not available, then the original text for that phrase will be maintained and displayed in the Web browser 200.

```
function TR( ){
  i=lcid.selectedIndex//Option (Language) the user selected
  var vlcid=lcid.options[i].value //get the LCID
  var ilcid=0
  for(i=0;i<languages.length;i++)
    if(languages[i][1]=vlcid) //locate the row for the language
      ilcid=i
  search=document.all
  for(i=0;i<search.length;i++) {
    cn=search[i].className //look at each non-empty class
        name
    if (cn.length>0)
      {//Look up translation
      txt=languages[ilcid][2][search[i].className]
      if (typeof(txt)=="string") //if one exists, replace the
          text
        if (txt.length>0) search[i].innerHTML=txt
      }
  }
}
```

In place of a single language translation, translations from several languages may be concatenated and the result displayed instead. Furthermore, the translation may include HTML tags, allowing presentations (formatting, graphics, media files) appropriate for the language to be included. The Source HTML file appears normal except for the addition of a identifier number to the cascading style sheet class name, as shown in the example below.

```
<H1 Class=1> Change Password</H1>
<P Class=4.label> Enter New Password</P> . . .
<DIV Class=4.password>Confirm Password </DIV>
```

As previously mentioned, a person of ordinary skill in the art will recognize that there are many other ways to encapsulate the localization identifier in the HTML page.

The placing of all localized phrases (i.e. translations) into a single include-file results in a single file download that may be used by all pages on a Web site with new downloads being required only when the translation-text changes. This may result in smaller file downloads for dynamic pages where the data changes but the text remains the same (since all of the text may come for the localization file and thus exists in the browser cache). In addition, localization in accordance with the present invention does not require any knowledge of HTML.

Figure 2:
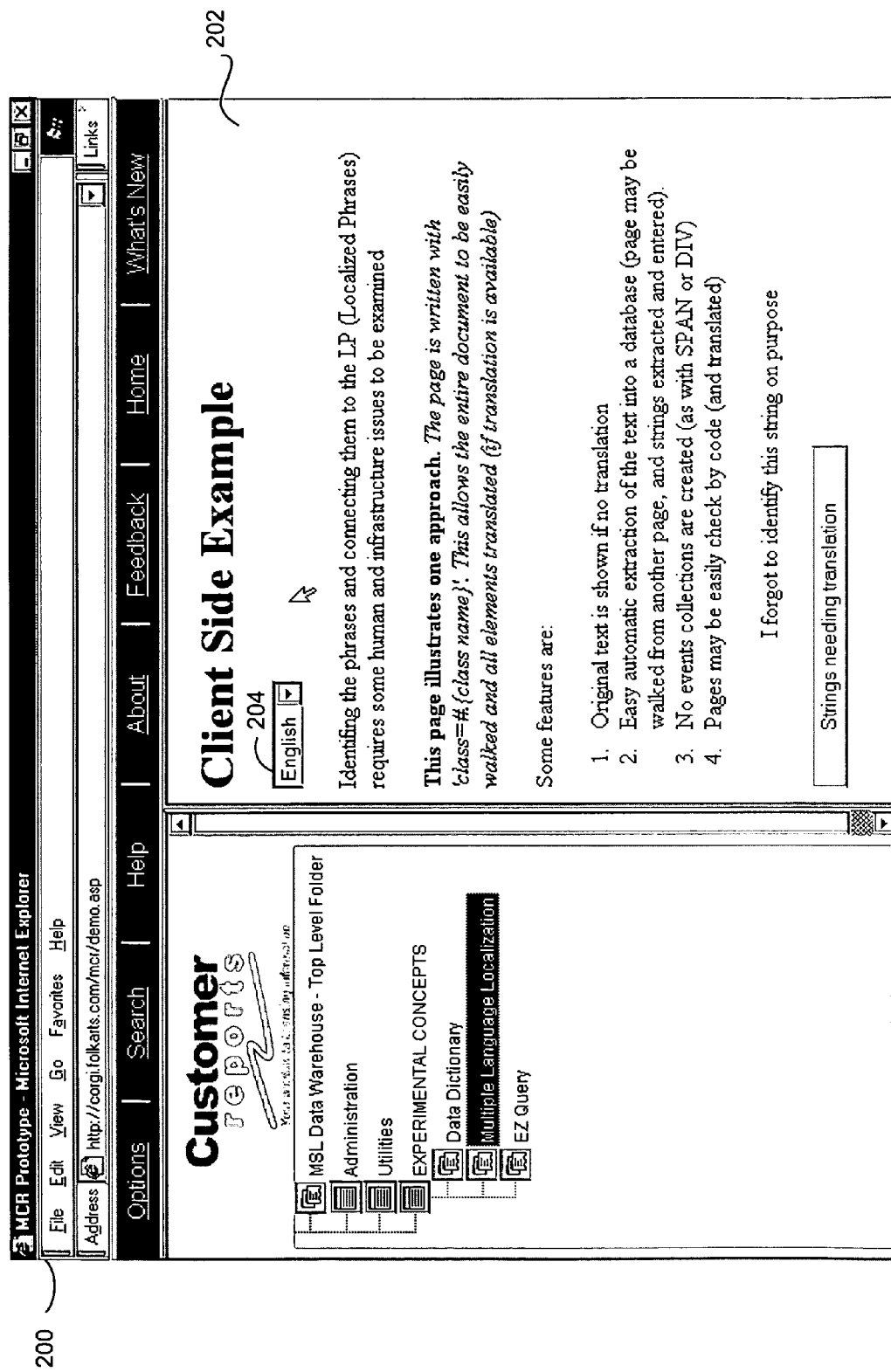
FIG. 2 illustrates a Web browser displaying an English language version of a sample Web document prepared in accordance with the present invention.

A sample implementation of the above-identified invention is shown in FIGS. 2-6. More particularly, FIG. 2 illustrates a Web browser 200 displaying an English language version of a sample Web document 202 prepared in accordance with the present invention. The HTML source code for this Web document 202 (i.e. Web page) is as follows.

```
<html>
<head>
<script LANGUAGE="JSCRIPT">
var ml=new Array
var l1=new Array
var l2=new Array
var l3=new Array
var l4=new Array
l1[3]="Identifing the phrases and connecting them to the
    LP (Localized Phrases) requires some human and infra-
    structure issues to be examined"
l2[3]="Identifing les expressions et les relier au LP (les
    expressions localisées) exige quelques l'humain et
    issues d'infrastructure à examiner"
l3[3]="Identifing las frases y conectarlos con el LP
    (Phrases) requires localizado algún ser humano y edi-
    ciones de la infaestructura que se examinarán"
l4[3]="Identifing die Phrasen und Anschließen sie an die
    Langspielplatte (beschränktes Phrases) requires einiger
    Mensch und zu überprüfende Infrastrukturausgaben"
l1[1]='Client Side Example'
l2[1]='Example Latéral De Client'
``` l3[1]='Ejemplo Lateral Del Cliente'
l4[1]='Klient Seitliches Beispiel'
l1[4]="This page illustrates one approach."
l2[4]="Cette page illustre une approche."
l3[4]="Esta paginación ilustra un acercamiento."
l4[4]="Diese Seite veranschaulicht eine Annäherung."
l1[5]="The page is written with 'class=#.{class name}'. This allows the entire document to be easily walked and all elements translated (if translation is available)"
l2[5]="La page est écrite avec le 'nom de class=#.{class}'. Ceci permet au document entier d'être facilement marché et tous les éléments d'être traduit (si la traduction est disponible)"
l3[5]="La paginación se escribe con 'nombre de class=#.{class}'. Esto permite que el documento entero ser recorrida y todos los elementos sea traducido fácilmente (si la traducción esta disponible)"
l4[5]="Die Seite wird mit 'class=#. {class-Namen}' geschrieben. Dieses erlaubt, wird daβ das gesamte Dokument, leicht gegangen zu werden, ubersetzt und alle Elemente (wenn Übersetzung vorhanden ist),"
l1[11]="Easy automatic extraction of the text into a database (page may be walked from another page, and strings extracted and entered)."
l2[11]="Extraction automatique facile du texte dans une base de données (la page peut être marchée d'une autre page, et ficelle extrait et entré)."
l3[11]="Extracción automática fácil del texto en una base de datos (la paginación se puede recorrer de otra paginación, y encadena extraído y entrado)."
l4[11]="Einfache automatische Extraktion des Textes in eine Datenbank (Seite kann von einer anderen Seite gegangen werden, und reiht extrahiert und hereingekommen auf)."
ml[1]=l1
ml[2]=l2
ml[3]=l3
ml[4]=l4
lp=l1
</script>
<title class="1">Client Side Example</title>
<body>
<h1 class="1">Client Side Example</h1>
<select name="lcid" onchange="translate( )">
<option value="1">English</option>
<option value="2">French</option>
<option value="3">Spanish</option>
<option value="4">German</option>
</select>
<p class="3">Identifying the phrases and connecting them to the LP (Localized Phrases)
requires some human and infrastructure issues to be examined</p>
<p><b class="4">This page illustrates one approach.</b><em class="5"> The page is written
with 'class=#. {class name}'. This allows the entire document to be easily walked and all elements
translated (if translation is available)</em></p>
<p> Some features are:</p>
<ol><li class="10"> Original text is shown if no translation</li>
<li class="11">Easy automatic extraction of the text into a
    database (page may be
walked from another page, and strings extracted and entered).</li>
<li class="12">No events collections are created (as with SPAN or DIV)</li>
<li class="13">Pages may be easily check by code (and translated)</li>
<ol>
<p align="center">I forgot to identify this string on purpose</p>
<input TYPE="button" onclick="missing( )" value="Strings needing translation" id="button1" name="button1">
</body>
<script LANGUAGE="JSCRIPT">
function missing( ) {
i=lcid.value
if (i>0){
    lp=ml[i]
}
search=document.all
for(i=0;i<search.length;i++) {
    //if(search[i].className <1 && test.length>0)alert
        ('Not marked for translation\n'+test)
    if(search[i].className>0) {
        test=search[i].innerHTML
        clid=search[i].className
        txt=lp[clid]
        if (typeof(txt)='string')
            alert('class='+clid+'\nis missing a translation of
                \n'+search[i].innerHTML)
    }
  }
}
function translate( ){
i=lcid.value
if (i>0) {
    lp=ml[i]
}
search=document.all
for(i=0;i<search.length;i++)
    if(search[i].className>0) {
        txt=lp[search[i].className]
        //alert(typeof(txt))
        if (typeof(txt)="string")
            if (txt.length>0) search[i].innerHTML=txt
    }
}
</script>
</html>

FIG. 2 shows the English language text version of this Web document 202 when viewed with a Web browser 200. In this example, English is the default language. A select box 204 is displayed on the Web document 202. This select box 204 identifies the language of the Web document 202 currently displayed. In FIG. 2, "English" is identified in the select box 204. Accordingly, the text of the Web document 202 is displayed in the English language.

Figure 3:
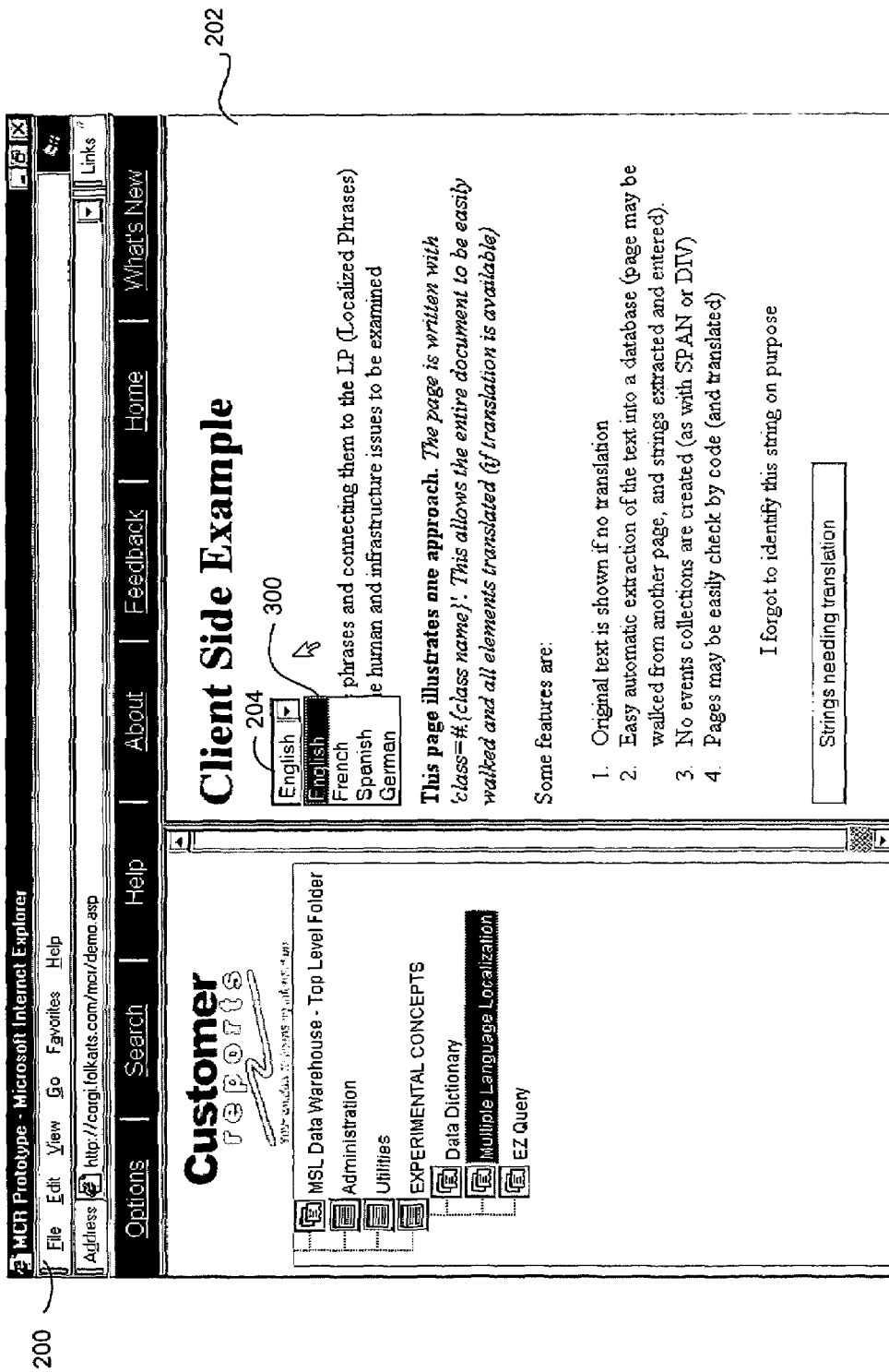
FIG. 3 depicts the Web browser and Web document of FIG. 2, in which the select box of available languages is shown.

FIG. 3 depicts the Web browser 200 and Web document 202 of FIG. 2. However, in FIG. 3, a user has clicked on (i.e. selected) the select box 204. Once selected, the select box 204 displays a list of languages 300 supported by the Web document 202. In this example, the list of languages 300 includes English, French, Spanish and German. Of course, the present invention is dynamic and enables a Web document to support any number of languages.

Figure 4:
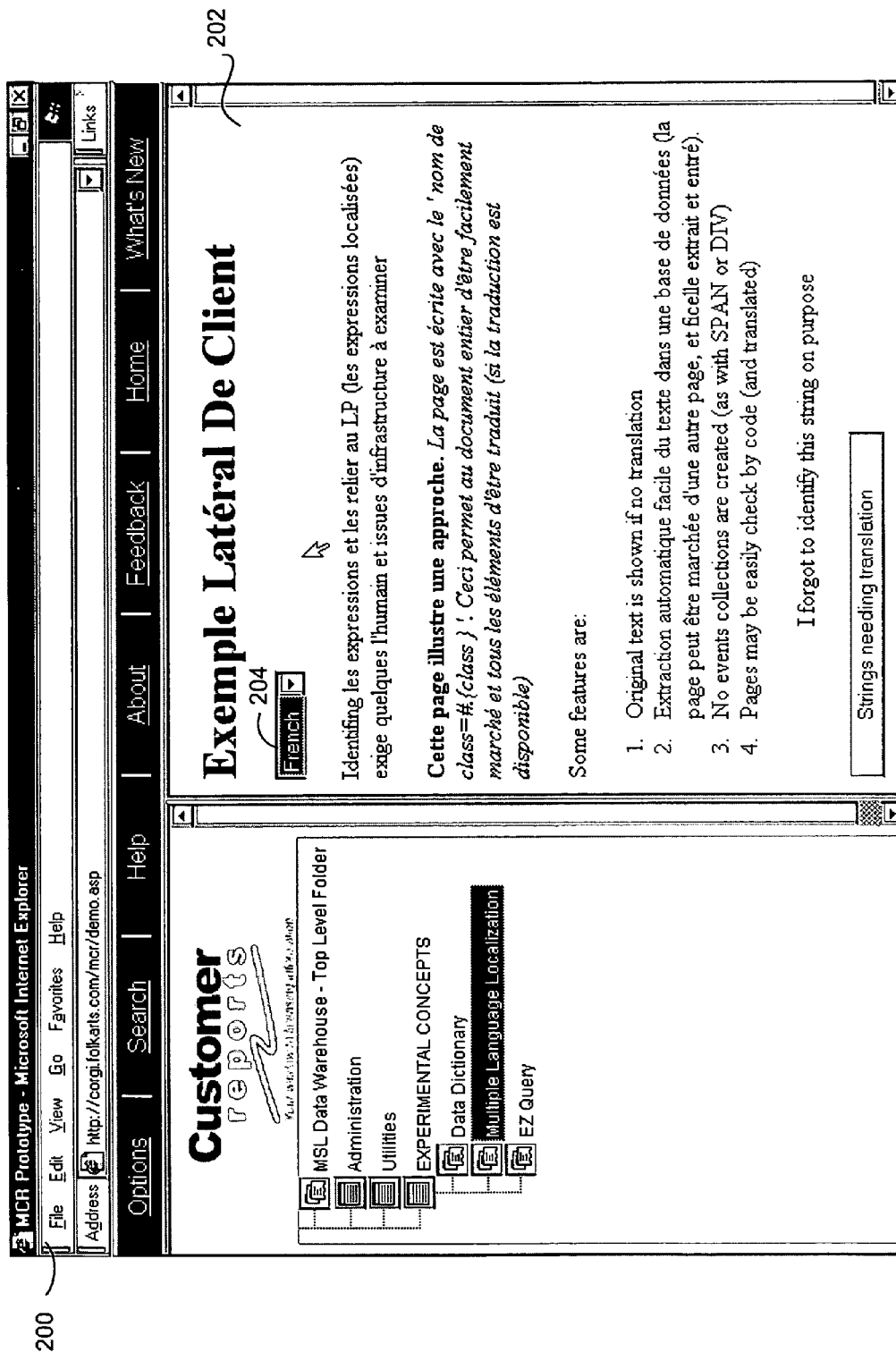
FIG. 4 shows the Web browser displaying a French translation of the Web document depicted in FIG. 2.

FIG. 4 shows the Web browser 200 and Web document 202 of FIG. 2, after a user has selected French from the select box 204. After the user selected French, the Web browser 200 searches the Web document 202 for identifiers for each phrase and/or word contained therein. The Web browser 200 then, using the identifiers in the HTML, substitutes the French translation for each phrase and/or word contained in the Web document 202. However, if a translation is not available for any phrase and/or word (in this case French), then the language of the text from the original Web document is maintained. In this example, the Web document was not provided with a French translation for the phrase "Original text is shown if no translation." Accordingly, this sentence was displayed in English (i.e. the language of the text from the original Web document). Nevertheless, the remainder of the Web document 202 was properly translated into French, as requested by the user.

Figure 5:
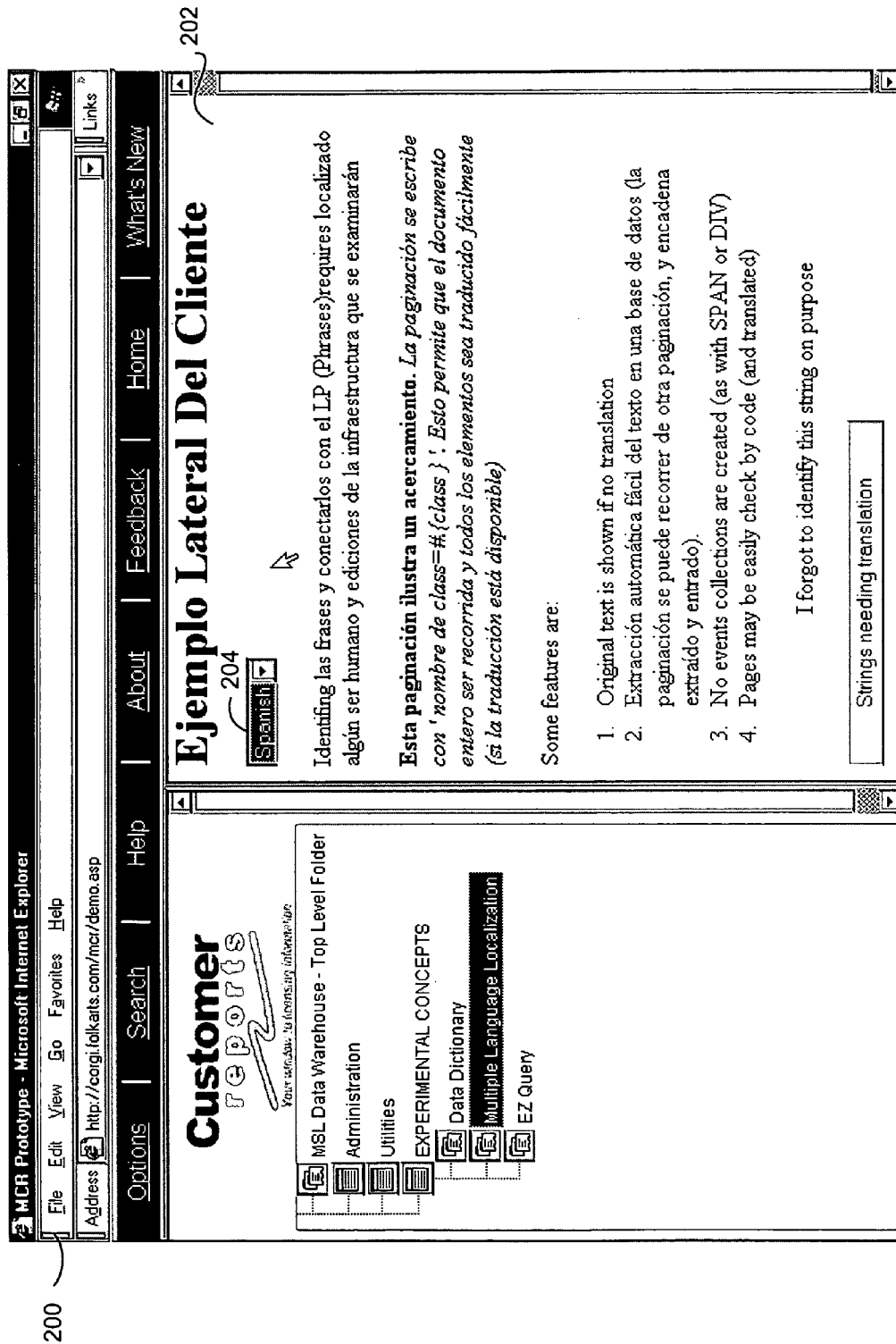
FIG. 5 illustrates the Web browser displaying a Spanish translation of the Web document depicted in FIG. 2.

FIG. 5 similarly shows the Web browser 200 and Web document 202 of FIG. 2, after a user has selected Spanish from the select box 204. After the user selected Spanish, the Web browser 200 searches the Web document 202 and substitutes the Spanish translation for each phrase and/or word contained therein. Again, if a Spanish translation is not available for any phrase and/or word, then the language of the text from the original Web document is maintained. In this example, the Web document was not provided with a Spanish translation for the phrase "Original text is shown if no translation." Accordingly, this sentence was displayed in English (i.e. the language of the text from the original Web document). Nevertheless, the Web browser 200 translated the remainder of the Web document 202 into Spanish, as requested by the user.

Figure 6:
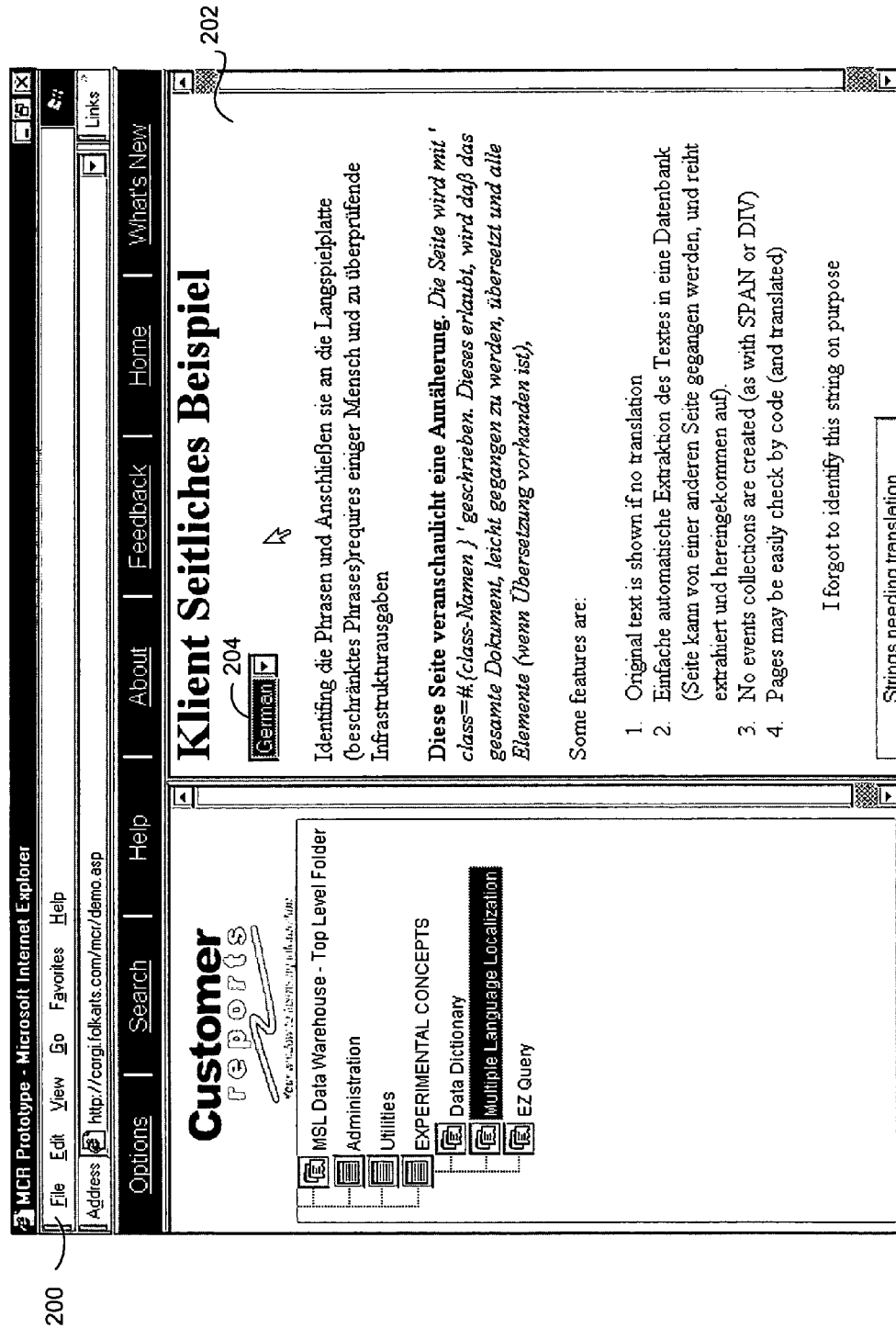
FIG. 6 shows the Web browser displaying a German translation of the Web document illustrated in FIG. 2.

Lastly, FIG. 6 shows the Web browser 200 and Web document 202 of FIG. 2, after a user has selected German from the select box 204. After the user selected German, the Web browser 200 searches the Web document 202 and substitutes the German translation for each phrase and/or word contained therein. As with the other languages, if a German translation is not available for any phrase and/or word, then the language of the text from the original Web document is maintained. The Web document 202 in this example was not provided with a German translation for the phrase "Original text is shown if no translation." Accordingly, this sentence was displayed in English (i.e. the language of the text from the original Web document). However, the Web browser 200 translated the remainder of the Web document 202 into German, as requested by the user.

Thus, the present invention has been described in the foregoing specification with reference to specific exemplary embodiments thereof. It will be apparent to those skilled in the art, that a person understanding this invention may conceive of changes or other embodiments or variations, which utilize the principles of this invention without departing from the broader spirit and scope of the invention as set forth in the appended claims. All are considered within the sphere, spirit, and scope of the invention. The specification and drawings are, therefore, to be regarded in an illustrative rather than restrictive sense. Accordingly, it is not intended that the invention be limited except as may be necessary in view of the appended claims.

What is claimed is:

1. A computer-readable medium having computer-executable instructions for performing steps comprising:

allowing a user to select a language in which at least a portion of an electronic file is to be displayed;

receiving the electronic file at the user's computer, wherein the electronic file's content includes a first plurality of phrases, wherein each phrase of the first plurality of phrases is expressed in a plurality of languages and has a meaning that is different than the meanings of other phrases of the first plurality of phrases regardless of the language in which said each phrase is expressed;

at the user's computer, selecting, for display to the user, from the first plurality of phrases, a second plurality of phrases that are expressed in the language selected by the user; and displaying to the user the second plurality of phrases that are expressed in the language selected by the user.

2. The computer-readable medium of claim 1 wherein the electronic file is received at the user's computer via the Internet.

3. The computer-readable medium of claim 1 wherein the electronic file is an HTML document.

4. The computer-readable medium of claim 3 wherein a Web browser displays the HTML document to the user.

5. The computer-readable medium of claim 4 wherein the Web browser translates at least a portion of the HTML document into the language selected by the user.

6. A method of providing an electronic file to a user comprising the steps of:

assigning to at least one word in the electronic file a plurality of identifiers, wherein each identifier corresponds to one of a plurality of respective translations in the electronic file for said at least one word; and at a receiving computer:

receiving the electronic file from a sending computer, allowing the user to select a language in which at least a portion of the electronic file is to be displayed, using an identifier from the plurality of identifiers, wherein the identifier corresponds to the language selected by the user, to obtain, from the respective translations in the electronic file, a translation, in the language selected by the user, for said at least one word, inserting the translation obtained from the electronic file into a translated electronic file, and displaying the translated electronic file to the user.

7. The method of claim 6 wherein the electronic file is an HTML document.

8. The method of claim 7 wherein the translation for said at least one word is stored in a data structure on a server.

9. The method of claim 8 wherein the data structure is an array.

10. The method of claim 9 wherein the translated HTML document is displayed by a Web browser.

11. The method of claim 10 wherein the translated HTML document is provided to the user via the Internet.

12. The method of claim 7 wherein a plurality of words in the HTML document are assigned a plurality of identifiers that correspond to said translation.

13. The method of claim 7 wherein a plurality of phrases in the HTML document are assigned a plurality of identifiers that correspond to said translation.

* * * * *